May 13, 1924.
P. L. ORR
CAM LEVER ELECTRODE HOLDER
Filed March 30, 1921
1,493,864
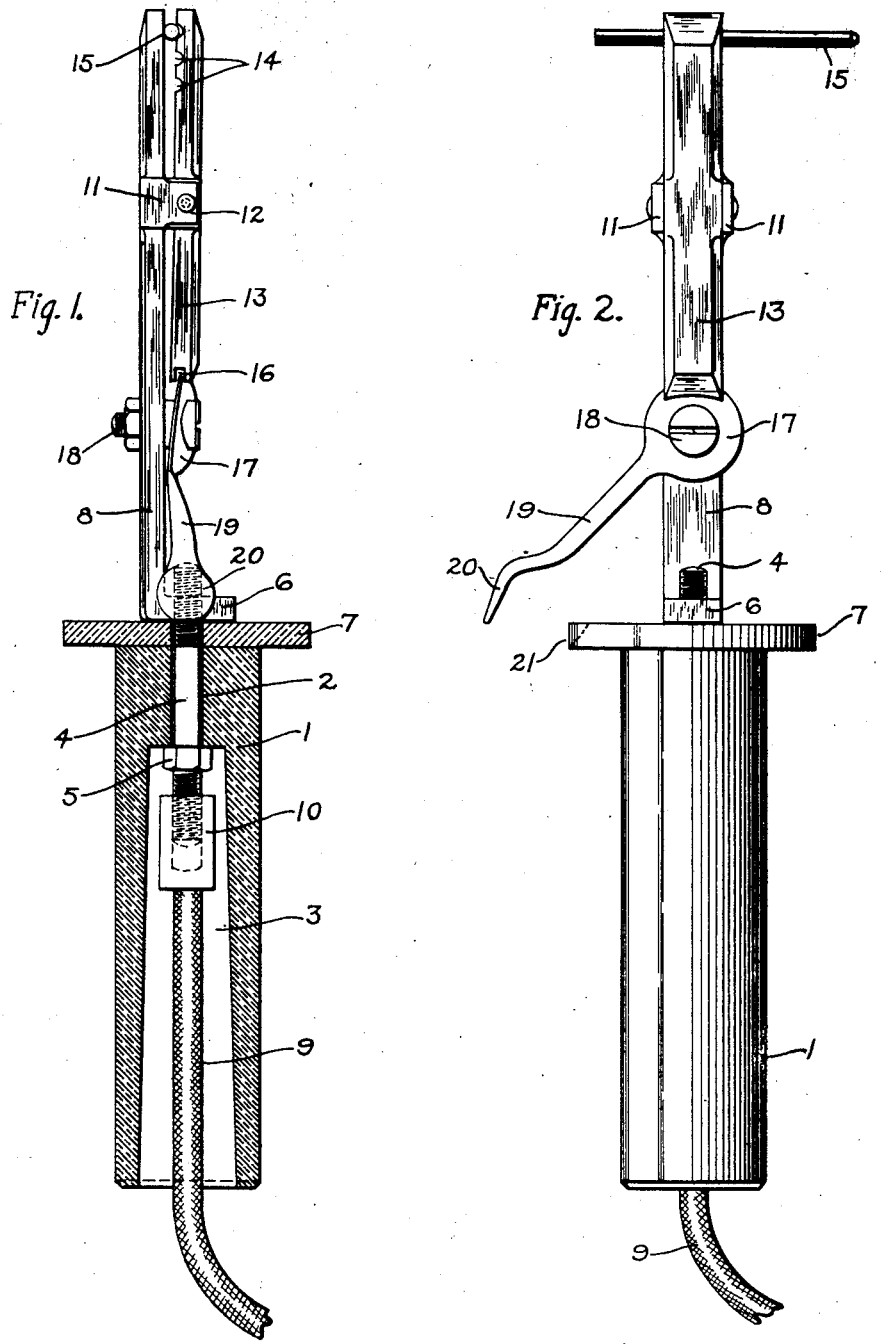
INVENTOR
Paul L. Orr.

Patented May 13, 1924.

1,493,864

UNITED STATES PATENT OFFICE.

PAUL L. ORR, OF PITTSBURGH, PENNSYLVANIA, ASSIGNOR TO WESTINGHOUSE ELECTRIC & MANUFACTURING COMPANY, A CORPORATION OF PENNSYLVANIA.

CAM-LEVER ELECTRODE HOLDER.

Application filed March 30, 1921. Serial No. 456,999.

*To all whom it may concern:*

Be it known that I, PAUL L. ORR, a citizen of the United States, and a resident of Pittsburgh, in the county of Allegheny and State of Pennsylvania, have invented a new and useful Improvement in Cam-Lever Electrode Holders, of which the following is a specification.

This invention relates to electrode holders, more particularly to an electrode holder of the cam-lever type.

Heretofore, various types of electrode holders have been proposed some of which were fairly successful in operation. The most common of such holders included in their structure one or more springs which either directly or indirectly clamped the electrode in place. In order to accomplish this, it was necessary that the springs be of high tension, and, when the strength of the springs was great enough to firmly grip the electrode, it was difficult to either insert a fresh electrode or to remove the stub of a burnt-out electrode from the holder. If the spring was weak enough to allow the insertion of an electrode readily, it was generally not sufficiently strong to hold the electrode firmly, especially when it adhered or "froze" to the work being welded. Furthermore, under the intense heat developed in welding, the springs lost their temper and thus became useless, destroying the operativeness of the holder.

Electrode holders, embodying various structures intended to obviate the necessity for using springs, have been proposed but such structures were either complicated or inconvenient to use. One such device included an arcuate member in which the electrode was placed and gripped by a cam bearing thereon, the cam being operated by a lever. In this device, the electrode became bent and it was difficult for the operator to properly hold an arc on account thereof. Furthermore, the operating lever of the cam gripping device was rather close to the work being welded and became hot, making it almost impossible for the operator to touch the same for the removal of a stub or the insertion of a new electrode.

My invention is designed to obviate the difficulties encountered in structures hitherto used, it being among the objects thereof to devise an electrode holder which is simple in construction and sturdy and which may easily be manipulated and be devoid of springs.

In practising my invention, I provide a hollow handle having a guard at the forward end thereof and into which a current-carrying cable is inserted. I provide a bar which is electrically connected to the cable and carries, at its outer end, a pivoted member, the outer end of said member being adapted to grip an electrode. An operating device, comprising a cam and a lever secured thereto, is also fixed on said bar.

In the accompanying drawings, forming a part hereof and in which like reference characters indicate like parts, Fig. 1 is a plan view of an electrode holder constructed in accordance with my invention, some parts being shown in section, and Fig. 2 is a view thereof in side elevation.

I provide a handle 1 having a central opening 2 therein and an enlargement or recess 3 in the rear portion thereof. A stud bolt 4 is placed in said opening 2 and is secured therein at one end, by a nut 5 and, at the other end, by being threaded into the base 6 of an outwardly extending bar 8. A shield 7 of any suitable insulating material is interposed between base 6 and handle 1. A cable 9, extending into recess 3, is secured to the adjacent end of stud bolt 4 by any suitable means, such as sleeve 10.

Near the outer end of bar 8 is formed a pair of ears 11 having a pivot 12 therebetween. A member 13 is pivoted between said ears, the outer end of said member being provided with grooves or recesses 14 adapted to hold an electrode 15 between member 13 and bar 8. The inner end of said member is formed with an angularly placed groove 16 into which projects a cam 17 that is pivoted, by bolt 18, to the bar 8. A lever 19 extends therefrom and is formed with a thumb member 20 at its rear end, and a notch 21 in the guard 7 allows said thumb member to rest therein when the holder is in operative position.

The operation of the device is as follows: Thumb member 20 is raised to cause cam 17 to draw the rear end of member 13 toward bar 8, thus opening the jaws formed between the forward end thereof and the forward end of said bar. An electrode is then inserted into any of the notches 14 desired, the series of notches being adapted to accommodate electrodes of various sizes. Thumb member 20 is then pressed down until the jaws have firmly gripped the electrode.

It will be seen that my new electrode holder provides a structure which is rigid and simple, the operation of the various movable parts is positive and there is practically no lost motion in the device. The "freezing" of an electrode to the work does not, in any way, affect the operation of the holder, since the grip of the jaws on the electrode is sufficient to enable the operator to overcome the freezing of the electrode. By providing a large surface area of contact of the eletrode with bar 8 and causing the electrode to be held firmly between the jaws, a good electrical connection is made and the danger of arcing, and thus burning the end of the holder, is practically eliminated.

I claim as my invention:

1. An electrode holder comprising a handle, a bar extending therefrom, a member pivoted thereto, means on said member for holding an electrode, and rigid means for moving the same into contact with said electrode.

2. An electrode holder comprising a handle, a bar extending therefrom, a member pivoted thereto, means on one end of said member for holding an electrode, and rigid means on the other end thereof for moving the same into contact with said electrode.

3. An electrode holder comprising a handle, a bar extending therefrom, a member pivoted thereto, means on said member for holding an electrode, and a cam arrangement for moving the same into contact with said electrode.

4. An electrode holder comprising a handle, a bar extending therefrom, a member pivoted thereto, means on said member for holding an electrode, and means for moving the same into contact with said electrode comprising a cam pivoted to said bar and engaging said member and means for actuating said cam.

5. An electrode holder comprising a handle, a bar extending therefrom, a member pivoted thereto, means for holding an electrode on said member, means for moving the same into contact with said electrode, comprising a groove in the end of said member, a cam pivoted to said bar and inserted into said groove, and means for actuating said cam.

6. An electrode holder comprising a handle, a bar extending therefrom, a member pivoted thereto, a series of notches on said member for holding an electrode, and rigid means for moving the same into contact with said electrode.

7. An electrode holder comprising a handle, a bar extending therefrom, a current-carrying cable in said handle, said bar being connected to one end of said cable, ears on said bar, a member pivoted therebetween, means on said member for holding an electrode, and rigid means for moving the same into contact with said electrode.

In testimony whereof, I have hereunto subscribed my name this 25th day of March 1921.

PAUL L. ORR.